Nov. 6, 1962    G. A. EVANS    3,062,046
FLUID PRESSURE OPERATED FORCE MEASURING APPARATUS
Filed May 12, 1958    6 Sheets-Sheet 1

INVENTOR
G. A. EVANS
BY
Holcomb, Wetherill & Brisebois
ATTORNEYS

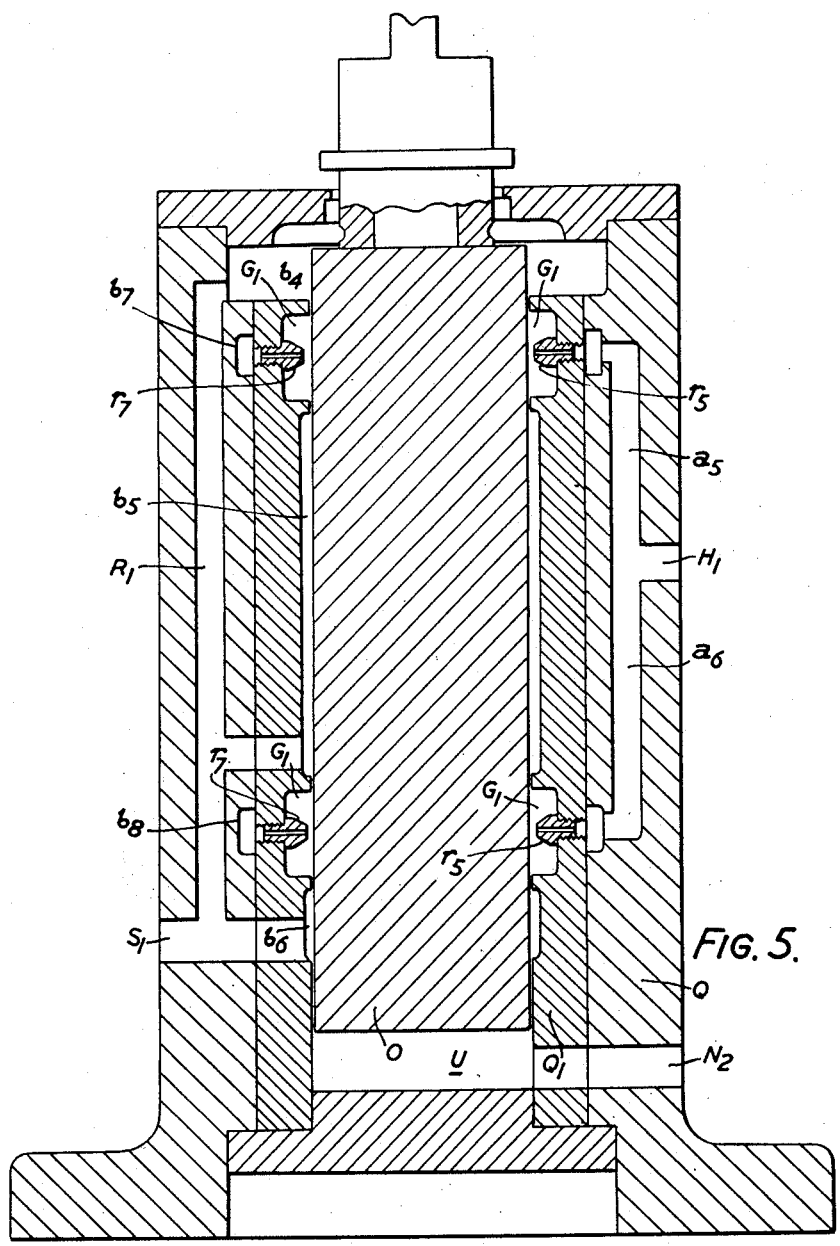

Nov. 6, 1962    G. A. EVANS    3,062,046
FLUID PRESSURE OPERATED FORCE MEASURING APPARATUS
Filed May 12, 1958    6 Sheets-Sheet 5

INVENTOR
G. A. EVANS
BY
Holcombe, Wetherill & Brisebois
ATTORNEYS

Nov. 6, 1962 G. A. EVANS 3,062,046
FLUID PRESSURE OPERATED FORCE MEASURING APPARATUS
Filed May 12, 1958 6 Sheets-Sheet 6

INVENTOR
G. A. EVANS
BY
Holcombe, Wetherill & Brisebois
ATTORNEYS

United States Patent Office 3,062,046
Patented Nov. 6, 1962

3,062,046
FLUID PRESSURE OPERATED FORCE MEASURING APPARATUS
Godfrey Arthur Evans, Malvern, England, assignor to Heenan & Froude Limited, Worcester, England, a company of Great Britain
Filed May 12, 1958, Ser. No. 734,776
Claims priority, application Great Britain May 14, 1957
4 Claims. (Cl. 73—133)

The present invention relates to fluid pressure operated force measuring apparatus.

According to the invention a fluid pressure operated force measuring apparatus includes a plunger or like member operating in a cylinder under pressure applied thereto and pressure fluid bearings supporting the plunger or like member for longitudinal movement within the cylinder thereby to prevent physical contact between the plunger or like member and the wall of the cylinder and thus eliminate all mechanical friction therebetween.

In this manner errors in measurement due to friction are largely reduced and apparatus according to the invention finds special application to the measurement of force where a maximum of accuracy is required. One such application is the checking or calibrating of the weighing gear associated with thrust measuring cradles for the testing of aircraft engines.

In the measurement of the thrust of aircraft engines, as the thrusts generated by pure jet engines and rocket motors increase, the problem of checking the accuracy of weighing gear fitted to thrust measuring cradles becomes more difficult. Up to the present time, it has been the practice to equip such cradles with some form of measuring or weighing gear capable of indicating jet thrust at a remote point in a control room. This weighing gear may be of any suitable type, such as a long mechanical linkage to a springless pendulum weigher, a hydraulic capsule or a strain gauge load cell. Of whatever kind the weighing gear may be, it has to be checked at intervals to ensure its accuracy or to calibrate it for inaccuracies. This entails the exertion of very accurately known forces on the cradle against which the weighing gear readings may be compared. Usually, such forces will have to be applied in a horizontal direction, although they may be required to be applied in a vertical direction or in a direction inclined with respect to the horizontal.

Hitherto, these checking forces have been chiefly applied by a system of levers and deadweights up to the full thrust capacity of the test plant. However, the values of these forces are now becoming so considerable that to retain the mechanical system would involve either excessive quantities of weights, or very large lever reduction ratios with consequent inaccuracy and complication of the apparatus.

It is an object of the present invention to provide fluid pressure operated checking gear for a thrust measuring cradle which permits the use of deadweights of moderate magnitude to exert very heavy checking loads with a high degree of precision.

According to a still further feature of the invention, therefore, such checking gear comprises a fluid pressure operated transmitter embodying the invention for transmitting fluid pressure proportional to a known load applied to the transmitter, a fluid pressure operated receiver embodying the invention for exerting a mechanical pressure upon application thereto of fluid pressure, and fluid flow means connecting the transmitter to the receiver whereby the fluid pressure generated by the transmitter is applied to the receiver which thus exerts a mechanical pressure proportional to the said known load.

Conveniently, the load is applied by means of test weights applied to the plunger of the transmitter which must therefore be vertically disposed. The receiver, however, must be capable of operation without loss of accuracy on a vertical, horizontal or any other axis, depending upon the type of apparatus being checked. The diameter of the receiver cylinder is made larger than that of the transmitter so that the mechanical force exerted by the receiver is proportionately greater than the load applied to the transmitter, the checking gear thus providing a very accurate pressure fluid operated means for intensifying a load applied thereto.

The same system may be applied in reverse, that is, as a de-intensifier, for use as a weighing gear or any form of test plant or apparatus where a comparatively large force has to be transmitted to some remote point and measured as a much smaller force, the transmitter cylinder therefore being of larger diameter than the receiver cylinder.

The invention will now be described with reference to the accompanying drawings, in which:

FIGURE 5 is a sectional elevation of the receiver unit of the checking gear of FIGURE 1;

Figure 8:
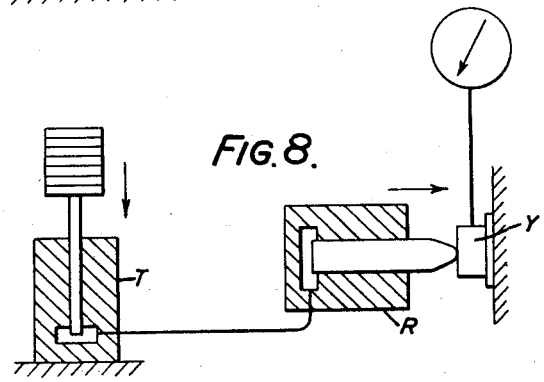
Figure 9:
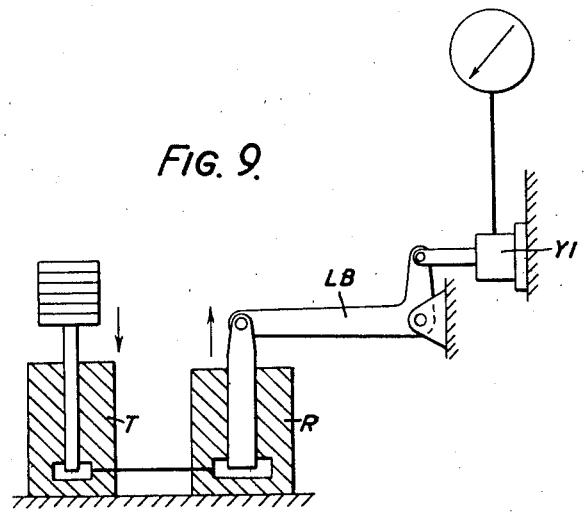
Figure 10:
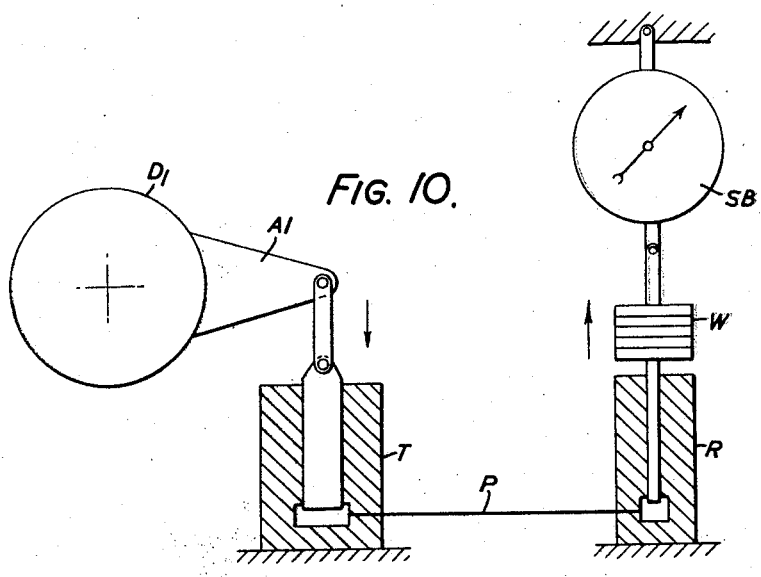

FIGURES 6, 7, 8 and 9 respectively show diagrammatically various ways in which the checking gear may be arranged; and FIGURE 10 shows diagrammatically a weighing or force measuring device embodying the invention.

Figure 1:
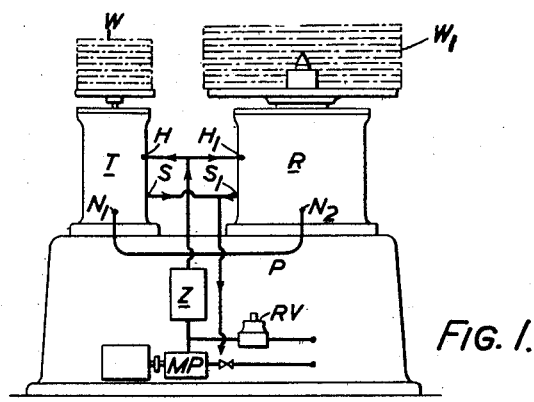
FIGURE 1 shows in diagrammatic form one arrangement of checking gear embodying fluid pressure operated force measuring apparatus according to the invention.

As will be seen in the drawings, the checking gear shown in FIGURE 1 comprises a transmitter unit T, a receiver unit R, a motor driven pump MP for supplying pressurised oil through a filter Z to inlet ports H and $H_1$ of the transmitter and receiver respectively, and a pipe P interconnecting outlet ports $N_1$ and $N_2$ respectively of the transmitter and receiver units. Drain pipes S, $S_1$ communicate with drain ports in the transmitter and receiver respectively and are connected by a common connection to an oil sump (not shown). The two units are mounted on a common bedplate and the bedplate incorporates the oil sump and means such as copper water cooling coils for cooling the oil. Alternatively, the transmitter and receiver units may be mounted separately any desired distance apart providing the pipe P is of a size adequate to reduce to a negligible amount the fluid friction losses along its length. The pump MP, may also be separately mounted any convenient distance from the transmitter and receiver units. A relief valve RV is connected on the pressure side of the pump MP for returning oil to the oil sump if the pump discharge pressure exceeds a predetermined amount. Checking weights W can be applied to the transmitter and further checking weights $W_1$ to the receiver and when the system is balanced the ratio of these weights will be in direct proportion to the multiplication ratio between the transmitter and receiver, i.e. the relation between the areas of the respective pistons or plungers.

Figure 4:
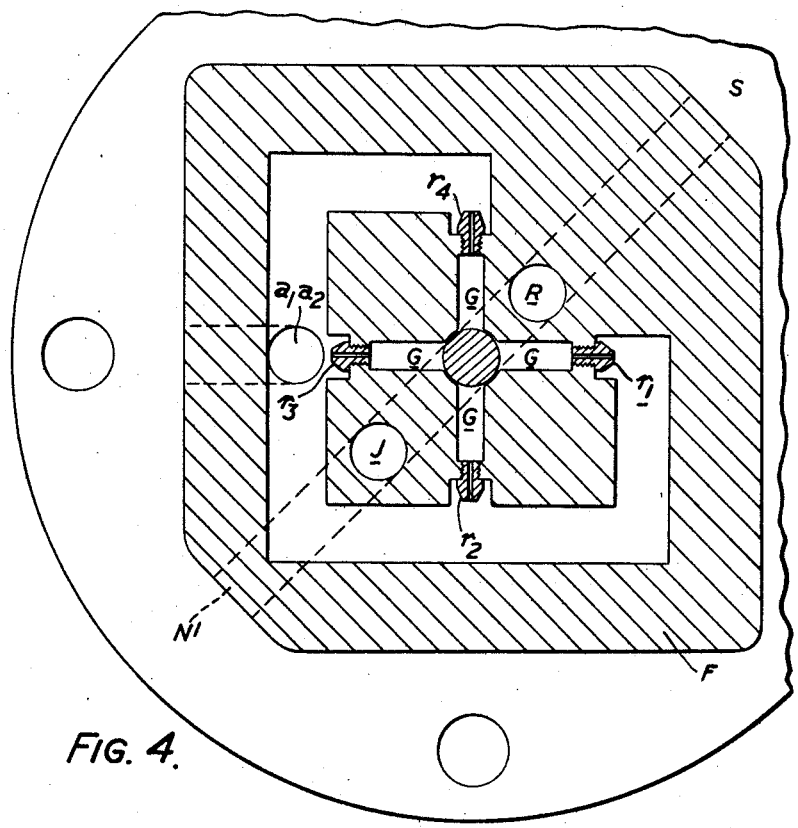
FIGURE 4 is a section taken along the line IV—IV of FIGURE 2.
Figure 2:
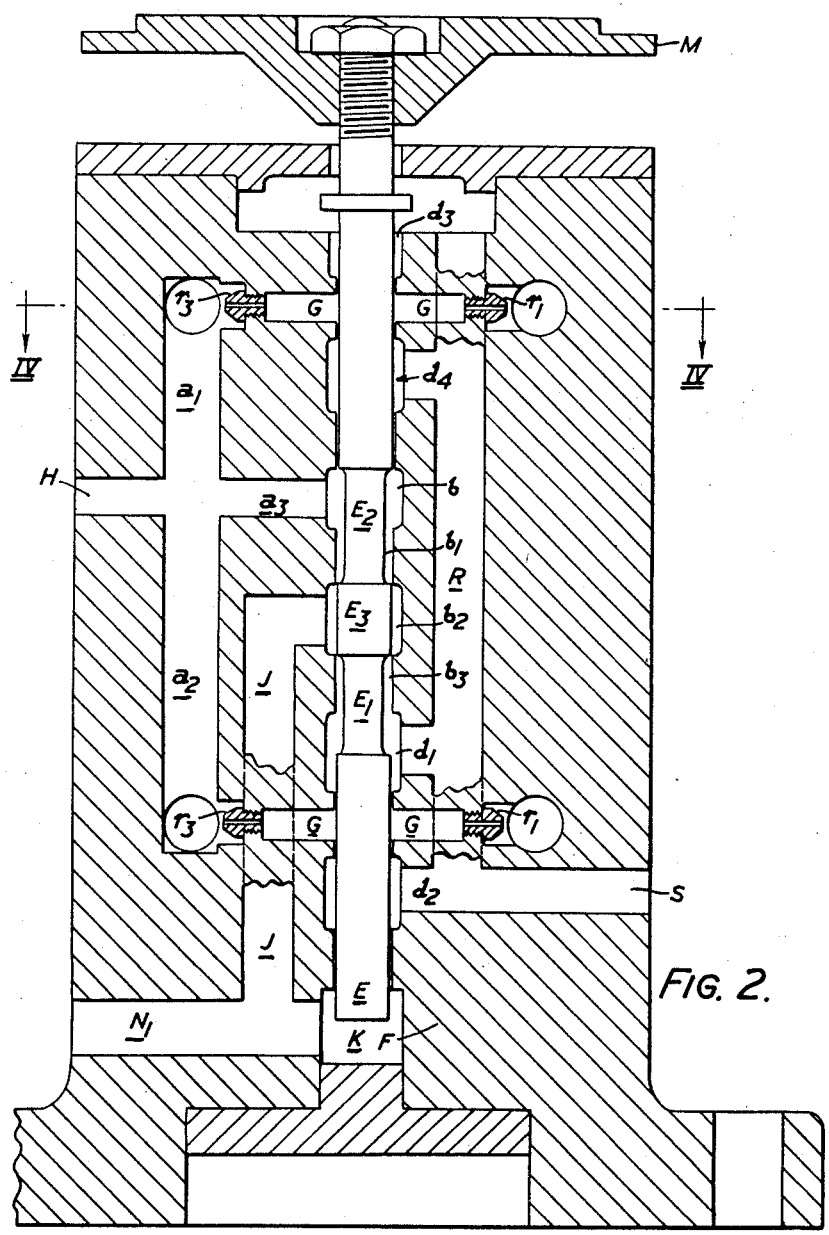
FIGURE 2 is a sectional elevation of the transmitter unit of the gear.
Figure 3:
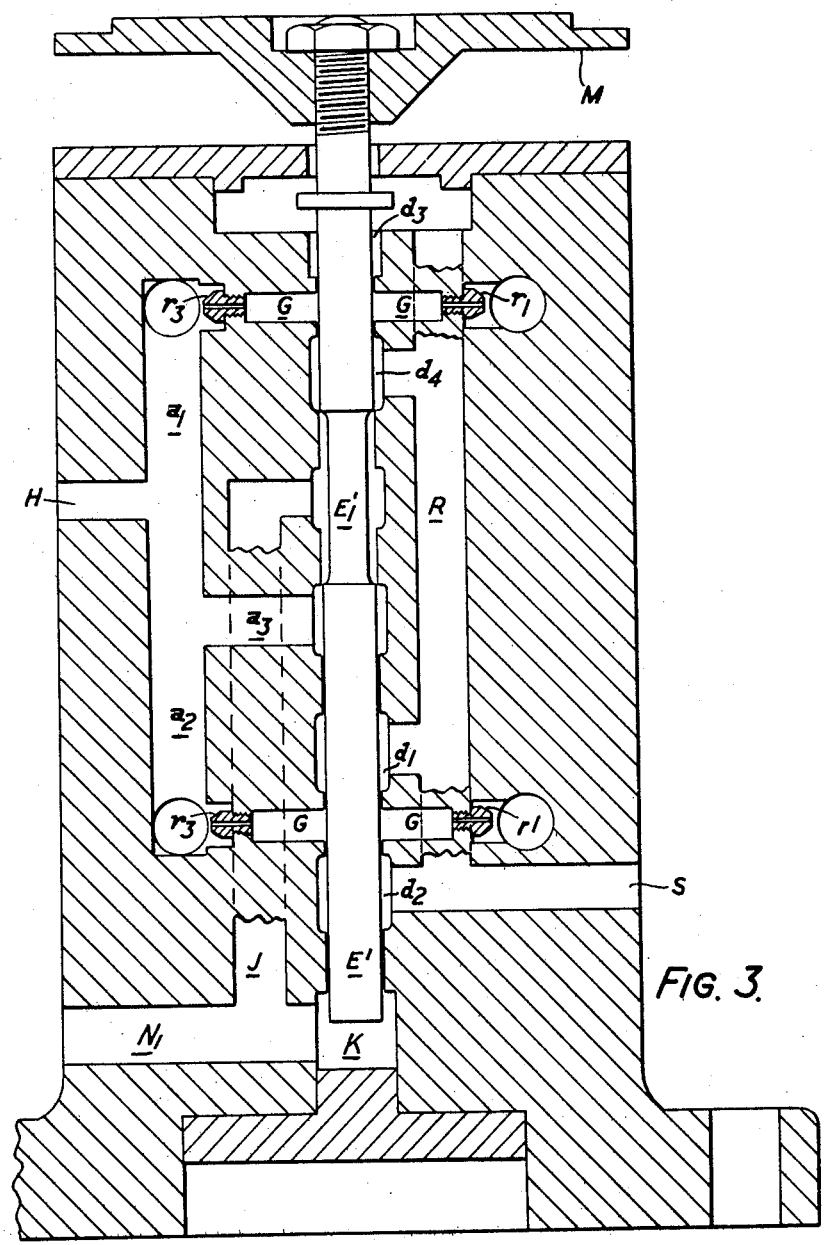
FIGURE 3 is a sectional elevation of an alternative construction of transmitter unit.

The transmitter unit T is shown in greater detail in FIGURE 2 and comprises a piston E working in a housing F having a piston-receiving bore constituting a cylinder for the piston which is supported in externally fluid pressurized bearings G at each end of the housing. The piston-receiving bore is made slightly larger in diameter than the piston to provide a radial clearance between the piston and the bore. This clearance is shown in exaggerated form in FIGURES 2, 3 and 4 and in actual practice is of the order of from .001 to .002 inch per inch of piston diameter. The piston E has two portions of reduced diameter $E_1$ and $E_2$ but a variation of this arrangement is shown in FIGURE 3 in which the piston $E^1$ is provided with only one reduced portion $E^1{}_1$. The lower end of the piston E projects into a cylinder K and the top end of the piston is provided with a weight pan M for receiving test weights of very accurately known value. Pressurized oil is delivered from the pump MP to the inlet port H and from thence through a passage $a_3$ to annular ducts $b$ and $b_1$ surrounding the plunger E.

A further annular duct $b_2$ surrounds the portion $E_3$ of the piston E between the portions $E_1$ and $E_2$ of reduced diameter and is in direct communication with a passage J which in turn connects with the cylinder K. When weights are applied to the weight pan M the piston E is urged downwardly thereby allowing high pressure oil from the annular ducts $b$ and $b_1$ to escape into the annular duct $b_2$. The pressure so generated is communicated through the passage J to the cylinder K and sustains the weights applied to the weight pan, but if too much upward pressure is exerted in the cylinder K the piston E rises, whereupon the supply of pressure oil from passage $a_3$ and through the annular ducts $b$ and $b_1$ to the annular duct $b_2$ is cut off by the piston portion $E_3$ and the pressure oil in the cylinder K is then allowed to leak through the passage J into an annular duct $b_3$ which is in direct communication with a drain port $d_1$ which, together with further drain ports $d_2$, $d_3$ and $d_4$, is in communication through a passage R and pipe S with the oil sump. The drain ports $d_1$, $d_2$, $d_3$, $d_4$ thus provide means whereby all leakage oil is returned to the oil sump for re-circulation by the pump MP.

It will thus be appreciated that the piston E takes up a position of equilibrium and remains supported in very substantially the same position irrespective of the weight supported by the weight pan. The oil pressure generated in the cylinder K and applied through the outlet port $N_1$ to the pipe line P is communicated to the transmitter which will thus be controlled directly according to the weight supported by the piston E.

In the alternative construction of transmitter shown in FIGURE 3 the piston $E^1$ is provided with only one portion $E^1{}_1$ of reduced diameter and the passages and ducts are slightly rearranged to co-operate with the modified piston $E^1$. The operation of the alternative transmitter of FIGURE 3 will, however, be readily apparent in view of the foregoing description of the construction and operation of the transmitter of FIGURE 2.

It is a feature of the invention to prevent any metallic contact between the piston E and its housing F thereby eliminating errors due to sliding friction and ensuring that the pressure develops in the cylinder K is an exact indication of the value of the externally applied load W. Thus, referring to FIGURE 2, the pressure oil admitted through port H passes not only through passage $a_3$ but also through passages $a_1$ and $a_2$ to two pressurized bearings G for the piston E and positioned respectively adjacent the upper and lower end of the piston. As will be more clearly seen in FIGURE 4, each pressurized bearing comprises four elongated chambers or pools G equally angularly spaced with respect to the axis of the piston and opening at one end into the piston-receiving bore of the housing F. The other end of each pool G is closed by a restrictor indicated at $r_1$, $r_2$, $r_3$, $r_4$ respectively for each of the pools G. The restrictors $r_1$, $r_2$, $r_3$, $r_4$ of the upper bearing communicate with the passage $a_1$ and the restrictors $r_1$, $r_2$, $r_3$, $r_4$ of the lower bearing communicate with the passage $a_2$. It will be understood that although four pools G are referred to the pressurized bearing may have only three pools or more than four pools.

Oil flowing through the pools G of the upper bearing escapes upwardly through the drain port $d_3$ and downwardly to the drain port $d_4$, while in the case of the lower bearing the escaping oil flows upwardly to the drain port $d_1$ and downwardly to the drain port $d_2$, the drain port $d_2$ also receiving leakage oil flowing upwardly from the cylinder K.

There will always be a flow of oil through the restrictors $r_1$, $r_2$, $r_3$ and $r_4$ by virtue of the axial leakage from the respective pools G to the drain ports $d_1$, $d_2$, $d_3$ and $d_4$. This is because of the radial clearance between the piston E and the piston receiving bore in the housing F. When the piston is truly concentric within the bore, the leakage from each individual pool will be the same and so will the oil flow through each of the four restrictors of the upper and lower bearings. If for any reason an unbalanced radial load or a force of any kind causes the piston E to move from its concentric position, it will approach one of the pools more closely, at the same time creating more clearance with the opposite pool. In such event, the axial leakage of oil to the respective drain port will be reduced where the pool clearance is low and will be increased where the pool clearance is made larger, and in consequence the flow of oil and the resistance loss will be reduced through the restrictor which feeds the pool where the clearance is lowest, while the reverse will apply on the opposite side of the piston where the pool clearance has become larger. It is thus clear that on the one side where clearance is low the pool pressure builds up and on the other side it is reduced so that there is a self-stabilizing force which tends always to restore the piston E to a true concentric position with approximately equal clearance all round, and thus with complete absence of metallic contact with the surrounding wall of the piston receiving bore of the housing F. It will be seen that the restrictors $r_1$, $r_2$, $r_3$ and $r_4$ with suitably designed resistance loss are an essential feature of the pressurized bearings and permit considerably larger clearance between the piston and housing to be employed, thereby to accommodate small manufacturing errors without fear of metallic contact between the piston and the housing.

One construction of receiver unit R is shown in greater detail in FIGURE 5 and comprises a piston O working in a housnig Q having a liner $Q_1$, the internal diameter of which is slightly greater than the external diameter of the piston O. There is thus provided a radial clearance between the piston and the liner and as in the case of the piston and housing of the transmitter unit, the clearance is shown in exaggerated form in FIGURE 5, and in practice will be of the order of from .001 to .002 inch per inch of piston diameter. Below the piston O is a cylinder U which is in communication with the transmitter T through the port $N_2$ and pipe P.

High pressure oil from the pump enters at port $H_1$ and passing through passages $a_5$ and $a_6$ reaches annular channels $b_7$ and $b_8$ formed in the housing Q and surrounding the liner $Q_1$. The two annular channels $b_7$ and $b_8$ are positioned one adjacent the upper end and one adjacent the lower end of the housing and feed restrictors $r_5$, $r_6$, $r_7$ and $r_8$ equally angularly spaced with respect to the axis of the piston O and of which only $r_5$ and $r_7$ are shown in the figure and from these restrictors oil is supplied to pressurized pools $G_1$, there being one pool $G_1$ to each restrictor. As in the case of the transmitter, there can be three or more pools for each bearing, but for the purpose of this description it is assumed that there are four per bearing.

Pressure oil from the upper pools $G_1$ leaks upwardly to an annular duct $b_4$ surrounding the upper end of the piston O and downwardly to an elongated annular duct $b_5$. In the case of the lower pools $G_1$ pressure oil leaks therefrom upwardly to the annular duct $b_5$ and downwardly to an annular duct $b_6$. The annular ducts $b_4$, $b_5$ and $b_6$ are all in communication wtih a passage $R_1$ which leads to a drain port $S_1$. From the description already given of the transmitter T it will be clear that due to the self-stabilising action of the restrictors and pools $G_1$, the receiver piston O does not make metallic contact with the walls of the liner $Q_1$ irrespective of whether it operates on a truly vertical axis, a horizontal axis, or in a position inclined with respect to the horizontal.

The cylinder U is connected to the cylinder K of the transmitter unit by the pipe P attached at the transmitter end to the outlet port $N_1$ and at the receiver end to the outlet port $N_2$. This pipe can be of any length, and provided it is sufficiently large enough to render negligibly small the pressure loss through it, then the pressure in the cylinder U and acting upon the piston O will be substantially equal to the pressure generated in the cylinder K of the transmitter unit T. Thus it will be seen that by making the area of the receiver piston O larger than the area of the transmitter piston E, a force of a desired magnitude can be made available at the receiver unit by the application of a relatively small weight applied to the transmitter piston E. It will be further seen that if the value of the weights applied to the transmitter are accurately known and the ratio of transmitter to receiver piston areas is equally accurately known, then the value of the force available at the receiver unit can likewise be accurately determined.

Various examples of the application of the checking gear embodying the invention are shown in FIGURES 6, 7, 8 and 9 respectively.

Figure 6:
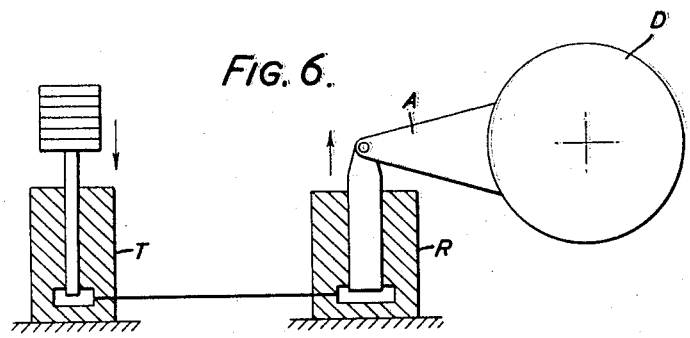

FIGURE 6 illustrates the use of the checking gear to apply a checking force to one end of a test arm A attached to the frame D of a rotary dynamometer.

The force is generated by weights applied to the piston of the transmitter T, is amplified due to the larger cross-sectional area of the piston of the receiver R, and is applied to the arm A through a connection between the piston of the receiver R and the test arm A.

Figure 7:
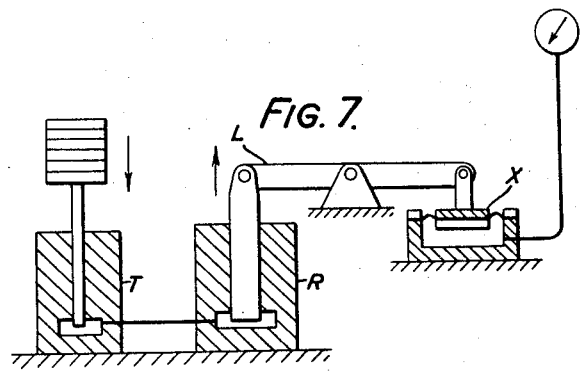

FIGURE 7 illustrates the use of the checking gear to apply a downward force of required magnitude to an hydraulic or hydrostatic capsule X, the force being applied from the piston of the receiver R through a pivoted lever L.

FIGURE 8 shows the checking gear used to apply a checking force to a strain gauge load cell Y, the receiver R being mounted horizontally for this purpose; while in FIGURE 9 the checking force is applied to a strain gauge load cell Y1 through a bell crank lever LB thereby permitting the receiver R to be positioned vertically.

It will be appreciated that the above illustrations are by way of example and that the checking gear already described can be used to verify and calibrate known forms of force measuring device, for example, mechanical springless weighers, spring balances, hydrostatic capsules, pneumatic and hydraulic weighing gears, and strain gauges. It will also be seen that the checking gear can be applied in any convenient manner either directly or indirectly through a lever system.

In another application of the invention, the apparatus can be used as a de-intensifier instead of as an intensifier, the transmitter piston being made larger in area than the receiver piston. One application of such a de-intensifier is for the measurement of torque exerted by a dynamometer and, as shown in FIGURE 10, the piston of the transmitter T is connected to the arm A1 of a dynamometer D1, while the piston of the receiver R is connected to a spring balance SB and loaded by means of weights W. The oil pressure generated by the downward thrust of the arm A1 on the piston of the transmitter is communicated through a single pipe P to the receiver which may be positioned at a suitably remote point from the transmitter. The diameter of the receiver piston is made suitably smaller than that of the transmitter piston so that the weights necessary on the piston of the receiver in order to balance the thrust of the dynamometer arm A1 can be conveniently small.

In an alternative arrangement, the transmitter can be connected to a plurality of receiver units working in conjunction with any suitable form of weighing gear to indicate at a desired number of points the force applied to the transmitter unit.

In all the above described applications the receiver unit or units can be adjacent to or at a remote distance from the transmitting unit.

In a further application of the invention the transmitter unit can be used without the receiver unit and the value of the force applied to the transmitter can be indicated on a pressure gauge or other convenient pressure sensitive device situated either adjacent to or remote from the transmitter unit.

Although in the above described constructions of checking gear oil is employed as the pressurized operating fluid, it will be understood that the operating fluid may consist of suitable liquids other than oil, or it may be in gaseous form.

I claim:
1. Fluid pressure operated force measuring apparatus comprising a fluid pressure operated means for generating a fluid pressure proportional to a force applied thereto, means for applying to said generating means a force to be measured thereby to generate a fluid pressure proportional to said force, and means for applying said generated fluid pressure to a pressure responsive force measuring means, the said measuring means comprising a housing, a bore in said housing, a piston slidable in said bore and having radial clearance therewith, means applying said generated fluid pressure to one end of said bore to act on the corresponding one end of the piston, a force measuring device connected to the other end of said piston for actuation thereby in response to fluid pressure exerted on the said one end of the piston, fluid pressure bearings in said housing adjacent each end of the piston for supporting the piston free from mechanical contact with the bore, a source of pressure fluid, means connecting said source to said fluid pressure bearings for supplying pressure fluid thereto and drain ports surrounding said piston and positioned between the said pressure bearings and the respective ends of the piston for discharging fluid which flows from the pressure bearings through the clearance between the piston and the bore.

2. Apparatus as claimed in claim 1 in which each said fluid pressure bearing comprises at least three fluid-receiving chambers in said housing angularly spaced with respect to the axis of the piston, an outlet from each chamber opening into said bore, an inlet leading from said connecting means into each chamber for supplying pressure fluid thereto, and a restrictor in said inlet designed to give a predetermined resistance loss for regulating the supply of fluid to the chamber.

3. Fluid pressure operated force measuring apparatus as claimed in claim 1, in which the said fluid pressure generating means comprises a housing, a bore in said housing, an elongated piston slidable in said bore and having radial clearance therewith, a cylinder at one end of said bore for receiving one end of the piston, force applying means at the other end of the piston for exerting axial thrust in a direction towards the said cylinder, a source of pressure fluid, means connecting said source to the cylinder for supplying fluid under pressure thereto for resisting the said axial thrust, means responsive to movement of the piston under said axial thrust for controlling the supply of pressure fluid to the cylinder, whereby the piston assumes a position of equilibrium in which the force exerted on the piston by pressure fluid in the cylinder balances the said axial thrust and the pressure in the cylinder is proportional to the force applied by said force applying means, fluid pressure bearings in said housing adjacent each end of the piston for supporting the piston free from mechanical contact with the bore, means connecting the source of pressure fluid to the said bearings for supplying pressure fluid thereto and drain ports surrounding said piston and positioned between the said pressure bearings and the respective ends of the piston for discharging fluid which flows from the pressure bearings through the clearance between the piston and the bore.

4. Apparatus as claimed in claim 3 in which each said fluid pressure bearing comprises at least three fluid-receiving chambers in said housing angularly spaced with respect to the axis of the piston, an outlet from each chamber opening into said bore, an inlet leading from said connecting means to each chamber for supplying pressure fluid thereto, and a restrictor in said inlet designed to give a predetermined resistance loss for regulating the supply of fluid to the chamber.

References Cited in the file of this patent

UNITED STATES PATENTS

| 1,232,983 | Schenk | July 10, 1917 |
| 1,938,492 | Moller | Dec. 5, 1933 |
| 2,049,343 | Warren | July 28, 1936 |
| 2,354,296 | Arms | July 25, 1944 |
| 2,908,164 | Bamber | Oct. 13, 1959 |
| 2,932,542 | Smith | Apr. 12, 1960 |

FOREIGN PATENTS

| 1,050,417 | France | Sept. 2, 1953 |